United States Patent Office 3,557,067
Patented Jan. 19, 1971

---

3,557,067
CROSS-LINKED VINYLIDENE/DICARBOXYLIC ACID ANHYDRIDE COPOLYMERS
Ernest Bingham Burns, Irvine, and Brian Benjamin Darlow and Robert Victor Smallman, Stevenston, Scotland, assignors to Imperial Chemical Industries Limited, London, England, a corporation of Great Britain
No Drawing. Filed Nov. 7, 1968, Ser. No. 774,193
Claims priority, application Great Britain, Nov. 20, 1967, 52,708/67
Int. Cl. C08f *15/40, 27/12*
U.S. Cl. 260—78.5       27 Claims

ABSTRACT OF THE DISCLOSURE

Cross-linking of vinylidene/dicarboxylic acid anhydride copolymers is achieved using organic ester or ether containing a vinylidene group and an alcoholic hydroxyl group or an ethynyl group.

The reaction is preferably carried out in the presence of a free radical catalyst and the products are salts which are water-soluble or water-swellable.

---

This invention relates to cross-linked alternating copolymers of alpha-beta unsaturated dicarboxylic acid anhydrides and vinylidene monomers and to their preparation. The copolymers of the invention form water-soluble or water-swellable salts.

Copolymers of alpha-beta unsaturated dicarboxylic acid anhydrides and vinylidene monomers, such as, for example, maleic anhydride/styrene copolymers, have previously been cross-linked by means of a compound having two or three double bonds, during the formation of the copolymer, as described in United Kingdom patent specification No. 715,412, or by reacting the copolymer with a compound containing a plurality of —OH, —SH or —NH groups as described in United Kingdom patent specification No. 856,320. Although these processes result in cross-linked products of enhanced viscosity, they are difficult to control reproducibly and the products have some undesirable properties. In the former process the cross-linking agents do not always combine uniformly with the monomers employed in the reaction and the products usually contain some very highly cross-linked material whose alkali metal salts remain as gelled lumps in aqueous solution. In the latter process the products give salts which are water-insoluble although water-swellable.

United Kingdom Pat. No. 1,069,637 describes the preparation of evenly cross-linked copolymers of alpha-beta unsaturated dicarboxylic acid anhydrides and vinylidene monomers cross-linked by means of an epoxy compound but these cross-linked copolymers have a marked tendency to undergo further cross-linking on storage with consequent reduction in solubility.

It is an object of this invention to provide an alternative method of cross-linking these copolymers to produce copolymers with good storage stability which will give aqueous solutions of more uniform consistency.

In accordance with this invention a cross-linked alternating copolymer of an alpha-beta unsaturated dicarboxylic acid anhydride and a vinylidene monomer, which copolymer is water-soluble or water-swellable either per se or in salt form, is cross-linked by means of up to 20% of its weight of an organic ester or ether containing a vinylidene group $CH_2{=}C{<}$ and an alcoholic hydroxyl —OH group or an ethynyl group $CH{\equiv}C$— (or both). The ester or ether may advantageously comprise hydroxyethyl methacrylate, hydroxyethyl acrylate, hydroxypropyl methacrylate, propylene glycol monoallyl ether and propargyl acrylate.

The alternating vinylidene/dicarboxylic acid anhydride copolymer may, for example, be a copolymer of maleic anhydride and a vinylidene monomer, for example methyl vinyl ether, ethyl vinyl ether, isobutyl vinyl ether, ethylene, propylene, isobutylene, vinyl acetate or styrene.

The cross-linked copolymers of the invention are prepared by copolymerisation of the alpha-beta unsaturated dicarboxylic anhydride, the vinylidene monomer and the cross-linking compound, preferably in presence of a free radical polymerisation catalyst.

The monomers and the cross-linking agent may be reacted together in bulk or in solution, but it is especially convenient to carry out the process in a liquid which is a solvent for the monomers and the cross-linking compound and a non-solvent for the cross-linked copolymer. The suitability of any particular liquid for this use will depend on the monomers and the cross-linking agent employed but liquid hydrocarbons or chlorinated hydrocarbons such as, for example, benzene, toluene, ethylene dichloride, methylene chloride, cyclohexane, dichloroethane, heptane or mixtures thereof, will be found advantageous in many cases.

Although using a relatively reactive catalyst the copolymerisation may be effected at ambient temperature, it is generally preferable to carry out the reaction at a temperature in the range 35 to 120° C. To avoid excessive loss of relatively volatile vinyl monomer the reaction may, if desired, be carried out at elevated pressures. It is also preferred to effect copolymerisation in a substantially oxygen-free atmosphere. Suitable polymerisation catalysts include, for example, peroxides, hydroperoxides, peresters and aliphatic azocompounds of which benzoyl peroxide, lauroyl peroxide, cumene hydroperoxide, di-isopropyl peroxydicarbonate or azobisisobutyronitrile are preferred.

The polymerisation may be carried out in a continuous manner, for example by adding the reactants continuously in one or more streams to a stirred heated reaction vessel and allowing the resultant slurry or suspension of polymer to flow over a dam in the vessel.

The cross-linking compound is chemically incorporated into the copolymer during the copolymerisation even at room temperature but with cross-linking compounds containing an alcoholic hydroxyl group it may be advantageous to subject the copolymer to further treatment, for example, subjection to elevated temperature in the presence of a catalyst in order to complete the cross-linking process. Suitable cross-linking catalysts include, for example, acidic substances such as boron trifluoride diethyl etherate and sulphuryl chloride and basic substances such as sodium hydroxide, tri-n-butylamine or pyridine.

The cross-linked copolymers of the invention exhibit higher viscosity in solution than the corresponding non-crosslinked copolymers.

Their aqueous solutions prepared generally have good shelf-life which may be further enhanced by the inclusion of antioxidants and heat stabilisers such as substituted phenols and aromatic amines or thiourea and photo-stabilisers to protect the solutions from degradation by light.

The cross-linked copolymers are especially useful in the preparation of cosmetic gels, for example for hair dressings, and they may also be used as thickening agents for textile applications, to alter the rheology or viscosity of aqueous solutions of polymer latices, in suspension polymerisation processes and in the formulation of polishes, adhesives, paint removers, lubricants, insecticides, herbicides and fungicides.

The invention is further illustrated by the following examples in which all parts and percentages are by weight.

EXAMPLE 1

A mixture of 50 parts of maleic anhydride, 70 parts of methyl vinyl ether, 3.5 parts of hydroxyethyl methacrylate, 0.4 part of lauroyl peroxide and 320 parts of toluene was heated and stirred in a sealed vessel for 4 hours at 60° C.

A theoretical yield of a copolymer of maleic anhydride and methyl vinyl ether (in approximately alternating sequence) incorporating about 4% of its weight of copolymerised hydroxyethyl methacrylate, was produced as a fine white powder which was filtered off and dried. 2.5 parts of the copolymer were dissolved in 400 parts water at 70° C.; the solution was titrated to pH 7 with 16% sodium hydroxide solution and diluted with water to a solution containing 0.5% of copolymer. The viscosity of this latter solution, as measured by a Brookfield LVT viscometer, spindle 4 at 25° C., was:

| Speed— | Viscosity (centipoises) |
|---|---|
| 12 | 47,750 |
| 6 | 78,000 |
| 3 | 121,000 |
| 1.5 | 182,000 |

EXAMPLE 2

A mixture of 50 parts of maleic anhydride, 70 parts of methyl vinyl ether, 1.5 parts of hydroxyethyl methacrylate, 400 parts of toluene and 0.37 part of lauroyl peroxide was heated in a sealed vessel with stirring at 60° C. for 4 hours. An almost theoretical yield of an alternating copolymer of methyl vinyl ether and maleic anhydride incorporating approximately 18% copolymerised hydroxyethyl methacrylate was produced as a fine white powder and was filtered and dried.

1 part of the copolymer was dissolved in 40 parts of hot water, titrated with 16% aqueous solution of NaOH solution to pH 7, and the resultant solution was diluted with water to a solution containing 2% of copolymer. This solution had the following viscosity, measured at 25° C. using a Brookfield LVT viscometer with spindle 4:

| Speed— | Viscosity (centipoises) |
|---|---|
| 6 | 76,500 |
| 3 | 118,000 |
| 1.5 | 188,000 |

A solution of 4.75 parts of sodium hydroxide in 100 parts industrial methylated spirits was added to a slurry of 20 parts of the copolymer in 100 parts methylated spirits. The resultant slurry was stirred at 65° C. for one hour then the solid, which was the solid partial sodium salt of cross-linked methyl vinyl ether maleic acid copolymer, was filtered off and dried in vacuum.

0.25 part of this salt was dissolved in 49.75 parts cold water and the resultant solution containing 0.5% of copolymer had pH 7 and viscosity, as measured by a Brookfield LVT viscometer using spindle 4, as follows:

| Speed— | Viscosity (centipoises) |
|---|---|
| 6 | 78,500 |
| 3 | 120,000 |
| 1.5 | 176,000 |

It is apparent from these viscosity measurements that heating with an alkaline reagent has enhanced the thickening power, i.e., the degree of cross-linking.

50 parts of the cross-linked copolymer were heated under reflux with stirring in 300 parts of toluene containing 0.1 part boron trifluoride etherate for 4 hours and were then filtered off and dried.

A 0.5% solution of the treated copolymer in water at pH 7 had the following viscosity, as measured by Brookfield LVT viscometer with spindle 4 at 25° C.:

| Speed— | Viscosity (centipoises) |
|---|---|
| 3 | 160,000 |
| 1.5 | 200,000 |

These measurements showed that treatment with an acidic reagent was even more effective than an alkaline reagent in developing cross-linking in the copolymer.

EXAMPLE 3

A mixture of 50 parts of maleic anhydride, 7 parts of ethyl vinyl ether, 1.34 parts of hydroxyethyl acrylate and 0.4 part of azobisisobutyronitrile dissolved in 320 parts of toluene was stirred and heated at 60 to 70° C. for about 2 hours. The resultant slurry was filtered and the solid obtained was dried under vacuum to give a theoretical yield of the alternating copolymer of ethyl vinyl ether containing copolymerised hydroxyethyl acrylate.

20 parts of the copolymer were slurried with 80 parts of industrial methylated spirits, a solution of 4 parts of sodium hydroxide in 80 parts of methylated spirits was added, the mixture was stirred at 65° C. for 1 hour and then filtered. The solid partial sodium salt obtained was dried and 1.5 parts were dissolved in water to give a 0.5% solution which had a viscosity of 1,300 cps. at 25° C. measured by the Brookfield LVT viscometer, spindle 2, speed 12.

A 0.5% aqueous solution of the partial sodium salt of a copolymer prepared as above but with the omission of the hydroxyethyl acrylate had a viscosity of 175 cps. at 25° C. measured by the Brookfield LVT viscometer.

EXAMPLE 4

20 parts of maleic anhydride, 1.2 parts of hydroxyethyl methacrylate and 2 parts of lauroyl peroxide were dissolved in 320 parts of isobutyl vinyl ether and the mixture was stirred and heated at 60° C. for 4 hours under an atmosphere of nitrogen. A voluminous white solid, which was the (approximately) alternating copolymer of isobutyl vinyl ether and maleic anhydride containing copolymerised hydroxyethyl methacrylate, separated and was filtered free of excess unreacted isobutyl vinyl ether and dried under vacuum. The copolymer was obtained as a white powder. The partial sodium salt of the copolymer, prepared as described in Example 3 with cold NaOH solution in industrial methylated spirits, was dissolved in water to give a 0.5% solution of the copolymer which had a viscosity of 4,700 cps. measured by the Brookfield LVT viscometer, spindle 3 and speed 6.

EXAMPLE 5

50 parts of maleic anhydride, 53 parts of styrene, 0.5 part of hydroxyethyl acrylate and 0.6 part of azobisisobutyronitrile were dissolved in 80 parts of benzene and the solution was stirred under an atmosphere of nitrogen for 3 hours during whch a voluminous precipitate separated. The precipitate, which was an approximately alternating copolymer of styrene and maleic anhydride containing copolymerised hydroxyethyl acrylate, was filtered off and dried. 20 parts of the copolymer were converted to a solid partial sodium salt with 3.67 parts of sodium hydroxide as described in Example 3. 1.5 parts of the partial sodium salt were dissolved in water to give a 0.5% solution which had a viscosity of 3,600 cps. at 25° C. measured by the Brookfield LVT viscometer, spindle 3, speed 6.

EXAMPLE 6

45 parts of maleic anhydride, 0.37 part of lauroyl peroxide and 2.25 parts of hydroxypropyl methacrylate were dissolved in a mixture of 280 parts of toluene and 56 parts of methyl vinyl ether. The solution was heated at 60 to 65° C. and stirred at atmospheric pressure while an atmosphere of methyl vinyl ether was maintained in the vessel.

After 5 hours the resultant slurry was filtered and dried to give a theoretical yield of the approximately alternating copolymer of methyl vinyl ether and maleic anhydride containing copolymerised hydroxypropyl methacrylate. 1.5 parts of the copolymer were swollen with 200 parts of hot water, the mixture was cooled and neutralised to pH 7 with 4% aqueous sodium hydroxide solution, then diluted with water to a total of 300 parts. The resultant clear solution had a viscosity of 16,000 cps. at 25° C. measured by the Brookfield LVT viscometer at speed 6, spindle 4.

EXAMPLE 7

A solution of 9.8 parts of maleic anhydride, 5.8 parts of methyl vinyl ether, 0.15 part of lauroyl peroxide and 0.5 part of propylene glycol mono-allyl ether in 24 parts of benzene was heated at 50° C. in a sealed vessel under an atmosphere of nitrogen for 18 hours. The (approximately) alternating copolymer of methyl vinyl ether and maleic anhydride containing copolymerised propylene glycol mono-allyl ether was produced in 97% yield and isolated by filtration and vacuum drying. 3 parts of the copolymer were dissolved in hot water, the solution was neutralised with sodium hydroxide solution and diluted with water to 300 parts. The resulting solution had a viscosity of 1,300 cps. measured by the Brookfield LVT viscometer, spindle 4, speed 6.

EXAMPLE 8

A solution of 50 parts of maleic anhydride, 68 parts of methyl vinyl ether, 5 parts of propargyl acrylate and 0.4 part of lauroyl peroxide was stirred and heated at 60 to 70° C. for 5 hours with a slight positive pressure of gaseous methyl vinyl ether maintained over the reaction mixture. The white precipitate which formed was filtered off and the solid dried under vacuum. A theoretical yield of the (approximately) alternating copolymer of methyl vinyl ether and maleic anhydride containing copolymerised propargyl acrylate was obtained. A 0.5% aqueous solution of the copolymer was thick, smooth, clear and sparkling with the consistency of butter. It had a viscosity of 248,000 cps. with spindle 4 and speed 1.5 on the Brookfield LVT viscometer.

EXAMPLE 9

A solution of 50 parts of maleic anhydride, 87 parts ethyl vinyl ether, 5.5 parts of propargyl acrylate and 0.6 part of lauroyl peroxide in 320 parts of toluene was stirred at 60° C. for 5 hours and a cross-linked ethyl vinyl ether maleic anhydride copolymer formed as a precipitate and was isolated as described in Example 8. A neutralised 5% aqueous solution of this copolymer was highly viscous.

EXAMPLE 10

A solution of 50 parts of maleic anhydride, 100 parts of vinyl acetate, 3.6 parts of hydroxyethyl methacrylate in 500 parts of dichloroethane was stirred in a stream of nitrogen for 10 minutes at 70° C. to remove any dissolved oxygen. 0.5 part of lauroyl peroxide catalyst was then added and the solution stirred under reflux at 70° C. for six hours, during which time polymer was precipitated as a fine powder.

The solid product was filtered off and dried in vacuum to give 93 parts of the copolymer of maleic anhydride and vinyl acetate containing copolymerised hydroxyethyl methacrylate.

A 0.5% solution of the copolymer in water, titrated to pH 7 with sodium hydroxide solution had a viscosity of 40,000 centipoises at 25° C. with Brookfield spindle 4, speed 1.5.

EXAMPLE 11

A solution of 200 parts of maleic anhydride, 14 parts of hydroxyethyl methacrylate and 2 parts of azobisbutyronitrile in 2,500 parts of benzene was charged into a stainless steel autoclave and pressurised to 12 p.s.i.g. with propylene which was then released to purge out any oxygen in the solution. This purge procedure was repeated and the autoclave then pressurised to 40 p.s.i.g. with propylene, at room temperature.

The autoclave was sealed and the contents heated to 60° C., the internal pressure rose to 100 p.s.i.g. The heating was continued, with stirring, for 24 hours, during which time the pressure dropped to 80 p.s.i.g.

The autoclave was then cooled, the excess of propylene released and the slurry of polymer that had been produced was filtered and the solid dried free of benzene in a current of air. A quantitative yield of the copolymer of propylene with maleic anhydride, containing copolymerised hydroxyethyl methacrylate was obtained.

A 1% solution of this copolymer in water titrated to pH 7 with sodium hydroxide solution had a viscosity of 28,000 centipoises at 25° C. with Brookfield spindle 3 and speed 1.5.

What is claimed is:

1. A cross-linked alternating copolymer of an alpha-beta unsaturated dicarboxylic acid anhydride and a vinylidene monomer copolymerisable therewith, which copolymer is water soluble or water swellable either per se or in salt form, cross-linked by means of up to 20% of its weight of a cross-linking agent comprising an organic ester or ether containing a vinylidene group $CH_2=C<$ copolymerisable with said anhydride and said vinylidene monomer and an alcoholic hydroxyl —OH group, said cross-linking agent having been incorporated into the alternating copolymer chains by copolymerisation through its vinylidene group during polymerisation of the unsaturated dicarboxylic acid and its vinylidene comonomer and said copolymer chains having been cross-linked by esterification of the hydroxyl groups of the cross-linking agent with anhydride groups of adjacent copolymer chains, the amount of said cross-linking agent being sufficient to increase the viscosity of said copolymer in water.

2. A cross-linked copolymer as claimed in claim 1 wherein the ester or ether is selected from the group consisting of hydroxyethyl methacrylate, hydroxyethyl acrylate, hydroxypropyl methacrylate and propylene glycol monoallyl ether.

3. A cross-linked copolymer as claimed in claim 1 wherein the alpha-beta dicarboxylic acid anhydride constituent comprises maleic anhydride.

4. A cross-linked copolymer as claimed in claim 1 wherein the vinylidene monomer constituent is selected from the group consisting of methyl vinyl ether, ethyl vinyl ether, isobutyl vinyl ether, ethylene, propylene, isobutylene, vinyl acetate and styrene.

5. A process for the preparation of cross-linked copolymers as claimed in claim 1 wherein an alpha-beta-unsaturated dicarboxylic acid anhydride and a vinylidene monomer copolymerisable therewith are copolymerised in the presence of a cross-linking agent comprising an organic ester or ether containing a vinylidene group $CH_2=C<$ copolymerisable with said anhydride and said vinylidene monomer and an alcoholic hydroxyl —OH group.

6. A process as claimed in claim 5 wherein the copolymerisation is carried out in the presence of a free radical catalyst.

7. A process as claimed in claim 6 wherein the catalyst is selected from the group consisting of a peroxide, a hydroperoxide, a perester and an aliphatic azocompound.

8. A process as claimed in claim 7 wherein the catalyst is selected from the group consisting of benzoyl peroxide, lauroyl peroxide, cumene hydroperoxide, di-isopropyl peroxydicarbonate and azobisisobutyronitrile.

9. A process as claimed in claim 8 wherein the reaction is carried out in a solvent.

10. A process as claimed in claim 9 wherein the copolymerisation is carried out in a liquid which is a solvent for the monomers and the cross-linking agent and a nonsolvent for the cross-linked copolymer.

11. A process as claimed in claim 10 wherein the monomers and the cross-linking agents are reacted together in a liquid hydrocarbon or chlorinated hydrocarbon.

12. A process as claimed in claim 11 wherein the liquid is selected from the group consisting of benzene, toluene, ethylene dichloride, methylene chloride, cyclohexane, dichloroethane, heptane and mixtures thereof.

13. A process as claimed in claim 12 wherein the reaction is carried out at an elevated temperature.

14. A process as claimed in claim 13 wherein the reaction temperature is in the range 35–120° C.

15. A process as claimed in claim 14 wherein the reaction is carried out at elevated pressure.

16. A process as claimed in claim 15 wherein the reaction is carried out in a substantially oxygen-free atmosphere.

17. A process as claimed in claim 5 wherein the alpha-beta unsaturated dicarboxylic acid anhydride comprises maleic anhydride.

18. A process as claimed in claim 5 wherein the vinylidene monomer is selected from the group consisting of methyl vinyl ether, ethyl vinyl ether, isobutyl vinyl ether, ethylene, propylene, isobutylene, vinyl acetate and styrene.

19. A process as claimed in claim 5 wherein the cross-linking agent is selected from the group consisting of hydroxyethyl methacrylate, hydroxyethyl acrylate, hydroxypropyl methacrylate and propylene glycol monoallyl ether.

20. A process as claimed in claim 16 wherein the copolymerisation is carried out in a continuous manner.

21. A process as claimed in claim 20 wherein the copolymerisation is carried out by adding the reactants continuously in one or more streams to a stirred heated reaction vessel and allowing the resultant slurry or suspension of polymer to flow over a dam in the vessel.

22. A process as claimed in claim 5 wherein the copolymer is subjected to further treatment, said further treatment comprising subjecting the copolymer to elevated temperature in the presence of a catalyst in order to complete the cross-linking process.

23. A process as claimed in claim 22 wherein the catalyst comprises an acidic or a basic substance.

24. A process as claimed in claim 23 wherein the catalyst is selected from the group consisting of boron trifluoride diethyl etherate, sulphuryl chloride, sodium hydroxide, tri-n-butylamine and pyridine.

25. A cross-linked copolymer as claimed in claim 1 whenever prepared by a process as claimed in any of claims 5 to 24.

26. A thickening agent comprising an aqueous solution of a cross-linked copolymer as claimed in any one of claims 1 to 4.

27. A thickening agent as claimed in claim 26 comprising an antioxidant, a heat stabiliser, or a photostabiliser.

References Cited
UNITED STATES PATENTS

| | | | |
|---|---|---|---|
| 2,988,539 | 6/1961 | Cohen et al. | 260—78 |
| 3,393,168 | 7/1968 | Johnson | 260—29.7 |
| 3,412,074 | 11/1968 | Derrick | 260—78.4 |
| 3,428,588 | 2/1969 | Skoultchi | 260—23 |

JOSEPH L. SCHOFER, Primary Examiner

J. KIGHT III, Assistant Examiner

U.S. Cl. X.R.

260—80.75, 80.76, 80.8, 80.81